(12) United States Patent
Yu et al.

(10) Patent No.: US 10,255,118 B2
(45) Date of Patent: Apr. 9, 2019

(54) PROCESSING SYSTEM INCLUDING A PLURALITY OF CORES AND METHOD OF OPERATING THE SAME

(71) Applicant: Samsung Electronics Co., Ltd., Suwon-si (KR)

(72) Inventors: Ki Soo Yu, Yongin-Si (KR); Kyung Il Sun, Suwon-si (KR); Chang Hwan Youn, Seongnam-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 906 days.

(21) Appl. No.: 14/061,783

(22) Filed: Oct. 24, 2013

(65) Prior Publication Data

US 2014/0196050 A1  Jul. 10, 2014

(30) Foreign Application Priority Data

Jan. 7, 2013  (KR) ................ 10-2013-0001760

(51) Int. Cl.
*G06F 9/46* (2006.01)
*G06F 9/50* (2006.01)

(52) U.S. Cl.
CPC .......... *G06F 9/5094* (2013.01); *G06F 9/5088* (2013.01); *G06F 2209/5022* (2013.01); *Y02D 10/22* (2018.01); *Y02D 10/32* (2018.01)

(58) Field of Classification Search
CPC ............... G06F 9/5088; G06F 9/5094; G06F 2209/5022; G06F 2209/502; Y02D 10/22; Y02D 10/32

USPC ................................ 718/100, 104, 105
See application file for complete search history.

(56) References Cited

U.S. PATENT DOCUMENTS

| | | | |
|---|---|---|---|
| 7,296,167 B1 * | 11/2007 | Hughes | G06F 12/0831 711/141 |
| 7,437,581 B2 | 10/2008 | Grochowski et al. | |
| 7,577,792 B2 | 8/2009 | Hady et al. | |
| 7,624,250 B2 | 11/2009 | Lau et al. | |
| 7,925,900 B2 | 4/2011 | Parks et al. | |
| 8,234,431 B2 * | 7/2012 | Kruglick | G06F 13/24 710/200 |
| 8,276,142 B2 * | 9/2012 | Alameldeen | G06F 9/505 718/1 |
| 8,984,200 B2 * | 3/2015 | Davis | G06F 9/4812 710/260 |
| 2008/0163239 A1 * | 7/2008 | Sugumar | G06F 9/5088 718/105 |
| 2010/0325388 A1 | 12/2010 | Howard | |
| 2011/0161978 A1 | 6/2011 | Jang et al. | |
| 2011/0265090 A1 * | 10/2011 | Moyer | G06F 1/3203 718/103 |

(Continued)

FOREIGN PATENT DOCUMENTS

JP   2008-181558   8/2008

*Primary Examiner* — Bradley A Teets
*Assistant Examiner* — Willy W Huaracha
(74) *Attorney, Agent, or Firm* — Muir Patent Law, PLLC

(57) ABSTRACT

A system and method of allocating resources among cores in a multi-core system is disclosed. The system and method determine cores that are able to process tasks to be performed, and use history of usage information to select a core to process the tasks. The system may be a heterogeneous multi-core processing system, and may include a system on chip (SoC).

17 Claims, 9 Drawing Sheets

(56) References Cited

U.S. PATENT DOCUMENTS

| | | |
|---|---|---|
| 2012/0131588 A1 | 5/2012 | Chung et al. |
| 2012/0159496 A1 | 6/2012 | Dighe et al. |
| 2012/0198207 A1 | 8/2012 | George et al. |
| 2012/0215984 A1 | 8/2012 | Hady et al. |
| 2012/0222033 A1 | 8/2012 | Byrum et al. |
| 2012/0324250 A1* | 12/2012 | Chakraborty ............ G06F 1/206 713/300 |
| 2013/0061237 A1* | 3/2013 | Zaarur .................. G06F 9/4856 718/105 |
| 2013/0262902 A1* | 10/2013 | Herdrich ............... G06F 9/5094 713/323 |
| 2013/0268742 A1* | 10/2013 | Yamada ................ G06F 9/5044 712/226 |
| 2013/0283277 A1* | 10/2013 | Cai ......................... G06F 1/329 718/102 |
| 2014/0026146 A1* | 1/2014 | Jahagirdar ............ G06F 9/4856 718/105 |
| 2014/0059558 A1* | 2/2014 | Davis .................... G06F 9/5044 718/103 |
| 2014/0082630 A1* | 3/2014 | Ginzburg ............ G06F 15/7807 718/105 |
| 2014/0101411 A1* | 4/2014 | Sakarda ............. G06F 15/7842 712/42 |
| 2014/0129808 A1* | 5/2014 | Naveh .................. G06F 9/4856 712/225 |
| 2014/0173623 A1* | 6/2014 | Chang .................. G06F 9/5088 718/105 |

* cited by examiner

PROCESSING SYSTEM INCLUDING A PLURALITY OF CORES AND METHOD OF OPERATING THE SAME

CROSS-REFERENCE TO RELATED APPLICATIONS

This application claims priority under 35 U.S.C. § 119(a) to Korean Patent Application No. 10-2013-0001760 filed on Jan. 7, 2013, the disclosure of which is hereby incorporated by reference in its entirety.

BACKGROUND

This disclosure relates to a method of operating a central processing unit (CPU), and more particularly, to a system on chip (SoC) including a plurality of cores, some having different types from others, a method of operating the SoC, and an apparatus including the same.

Mobile application processors often include multiple core systems that may include a high-performance core and a low-power core, which are integrated into a single chip in order to secure fast performance and low power consumption. However, the high-performance core has problems of power consumption, heat generation, and stability. Although the low-power core has low power consumption, it has limitations on task processing speed and capacity.

When a CPU load increases while a low-power core is being used, switching from the low-power core into a high-performance core may be made. As the number of high-performance cores being used increases, power consumption and heat generation increase greatly. Additionally, when the CPU load decreases, switching from the high-performance core to the low-power core is made.

Various switching methods have been developed to process a CPU load associated with one or more tasks faster and with lower power consumption in a multi-core system.

SUMMARY

A system for allocating resources among cores in a multi-core system is disclosed, as well as an apparatus and method for implementing the same. The system determines cores that are able to process tasks to be performed, and uses history of usage information to select a core to process the tasks. The system may be a heterogeneous multi-core processing system, and may include a system on chip (SoC). The determination of cores able to process the tasks to be performed may be made based in part on a load in a multi-core processor.

BRIEF DESCRIPTION OF THE DRAWINGS

The above and other features and advantages will become more apparent by describing in detail exemplary embodiments with reference to the attached drawings in which.

DETAILED DESCRIPTION

The disclosure now will be described more fully hereinafter with reference to the accompanying drawings, in which various exemplary embodiments are shown. This invention may, however, be embodied in many different forms and should not be construed as limited to the embodiments set forth herein. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and should not be interpreted in an idealized or overly formal sense unless expressly so defined herein.

Figure 1:
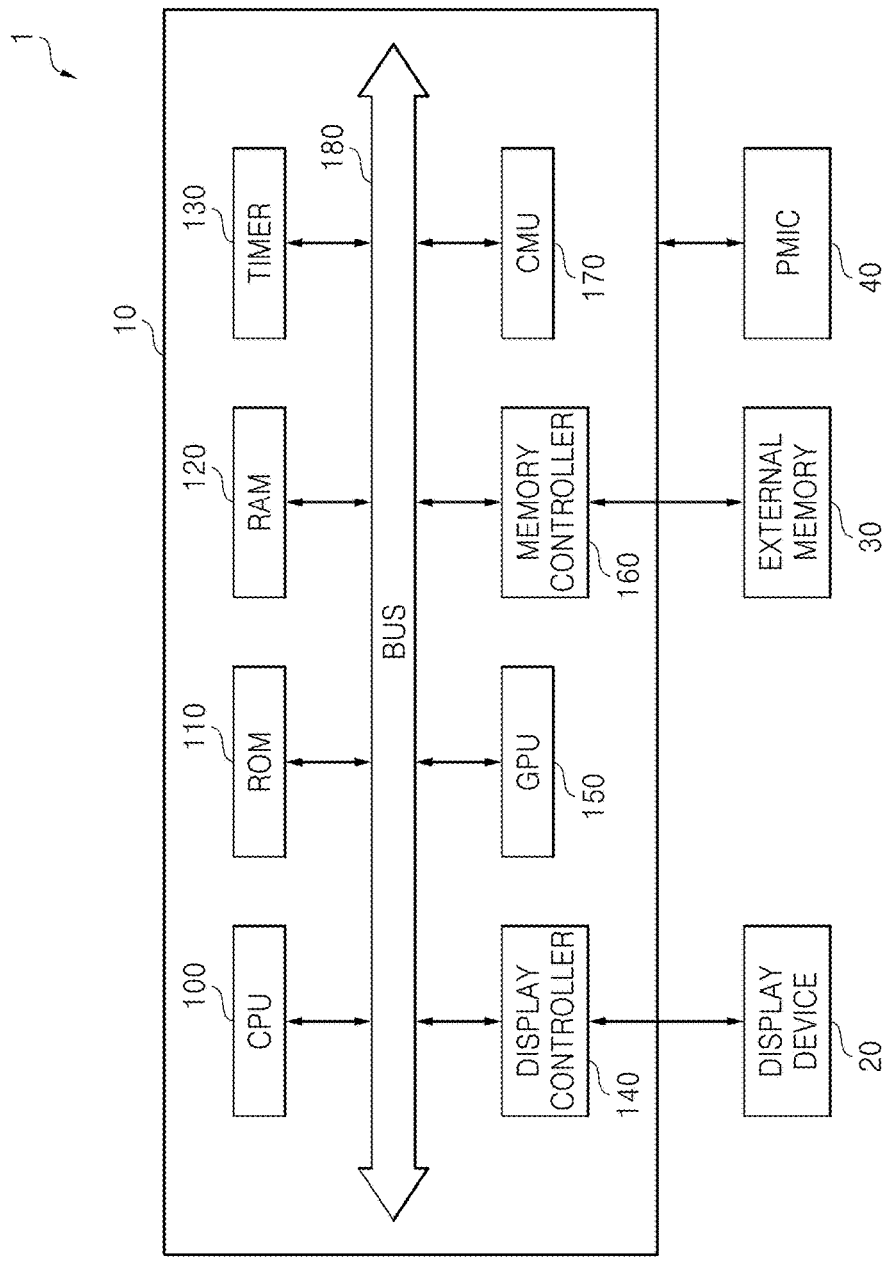
FIG. 1 is a block diagram of an electronic system according to some exemplary embodiments.

FIG. 1 is a block diagram of an exemplary electronic system 1 according to some embodiments. Referring to FIG. 1, the electronic system 1 may be implemented as a handheld device such as a mobile telephone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book. The electronic system 1 may include a system on chip (SoC) 10, an external memory 30, and a display device 20.

The SoC 10 may include a central processing unit (CPU) 100, a read-only memory (ROM) 110, a random access memory (RAM) 120, a timer 130, a display controller 140, a graphics processing unit (GPU) 150, a memory controller 160, a clock management unit (CMU) 170, and a bus 180. The SoC 10 may also include other elements. The electronic system 1 may also include a power management integrated circuit (PMIC) 40.

The PMIC 40 is implemented outside the SoC 10 in the embodiments illustrated in FIG. 1, but the SoC 10 may include a power management unit (PMU) that can perform the function of the PMIC 40 in other embodiments.

The CPU 100, which may be referred to as a processor, may process or execute programs and/or data stored in the external memory 30. For instance, the CPU 100 may process or execute the programs and/or the data in response to an operating clock signal output from the CMU 170. In one embodiment, the CPU 100 may be implemented by a multi-core processor. A multi-core processor, as described herein, refers to a single computing component with two or more independent actual processors (referred to as cores or core processors). Each of the core processors reads and executes program instructions.

As described further below, a multi-core processor may be a heterogeneous multi-core processing system, or a homogeneous multi-core processing system, and may have a symmetric core structure or an asymmetric core structure.

A heterogeneous multi-core processing system includes at least two sets of cores, wherein the first set of cores include first-type cores having a first type, and the second set of cores include second-type cores having a second type different from the first type. For example, the first-type cores may have a first architecture or type of architecture, and the second-type cores may have a different, second architecture. The first-type cores may be first-sized cores including, for example, transistors having a first size, and the second-type cores may be second-sized cores including, for example, transistors having a second size different from the first size. As such, first-type cores may have a physical size (e.g., cover a physical area) greater than or less than the physical size of the second-type cores. The first-type cores may be first-speed cores having, for example, a first maximum processing speed, and the second-type cores may be second-speed cores having, for example, a second maximum processing speed different from the first maximum processing speed. The different processing speeds may be due to, for example, larger voltages applied to certain of the cores than others, leading to faster maximum speeds for those cores to which a larger voltage is applied.

A symmetric multi-core processing system includes, for example, two sets of cores, wherein the first set has a first number of cores, and the second set has the same number of cores as the first set. Additional sets of cores may be used, also having the same number of cores. On the other hand, an asymmetric multi-core processing system includes at least two sets of cores, wherein the first set has a first number of cores, and the second set has a second number of cores different from the first set.

Returning to FIG. 1, the programs and/or the data stored in the ROM 110, the RAM 120, and/or the external memory 30 may be loaded to a memory (not shown) in the CPU 100 when necessary. The ROM 110 may store permanent programs and/or data. The ROM 110 may be implemented, for example, by erasable programmable ROM (EPROM) or electrically erasable programmable ROM (EEPROM).

The RAM 120 may temporarily store programs, data, or instructions. The programs and/or data stored in the memory 110 or 30 may be temporarily stored in the RAM 120 according to the control of the CPU 100 or a booting code stored in the ROM 110. The RAM 120 may be implemented, for example, by dynamic RAM (DRAM) or static RAM (SRAM).

The timer 130 may output a count value indicating a time based on an operating clock signal output from the CMU 170. The GPU 150 may convert data read by the memory controller 160 from the external memory 30 into a signal suitable to the display device 20. The CMU 170 generates the operating clock signal. The CMU 170 may include a clock signal generator such as a phase locked loop (PLL), a delay locked loop (DLL), or a crystal oscillator.

The operating clock signal may be applied to the GPU 150. The operating clock signal may also be applied to other elements (e.g., the CPU 100 or the memory controller 160). The CMU 170 may change the frequency of the operating clock signal.

The CPU 100 may control the allocation of resources among the cores included in the CPU. For example, the CPU 100 may power up and power down certain cores, may assign tasks or processes to be processed by certain cores, and may move tasks or processes from certain cores to other cores. The CPU 100 may determine the resources being used and resources available among the different cores, and may allocate those available resources to certain tasks depending on the core processing capabilities and availability, core processing histories, and the nature of the tasks to be processed.

For example, in one embodiment using low-power cores (e.g., cores having a lower maximum processing speed, and/or having smaller transistors) and high-performance cores (e.g., cores having a higher maximum processing speed, and/or having larger transistors), the CPU 100 assigns a task to a low-power core, measures a CPU load in the low-power core, and adjusts an operating frequency based on the measured CPU load. The CPU 110 can make a switch from the low-power core to a high-performance core when the measured CPU load exceeds a workload that can be performed in the low-power core, such that the task cannot be processed by the low-power core. As such, the task may be re-assigned to the high-performance core, and optionally the other tasks already being processed by the low-power core can be moved to the high-performance core. In addition, in one embodiment, when it is determined that a workload being performed in the high-performance core can be performed in the low-power core based on the measured CPU load, the CPU 100 can make a reverse switch from the high-performance core to the low-power core. The allocation and assignment or resources among cores of the CPU 100 will be discussed in greater detail below.

The memory controller 160 interfaces with the external memory 30. The memory controller 160 controls the overall operation of the external memory 30 and controls data exchange between a host and the external memory 30. For instance, the memory controller 160 may write data to the external memory 30 or read data from the external memory 30 at the request of the host. The host may be, for example, a master device such as the CPU 100, the GPU 150, or the display controller 140.

The external memory 30 is a storage medium for storing data and it may store an operating system (OS) and various kinds of programs and/or data. The external memory 30 may be DRAM, but the inventive concept is not restricted as such. For instance, the external memory 30 may be nonvolatile memory such as flash memory, phase-change RAM (PRAM), magnetic RAM (MRAM), resistive RAM (ReRAM) or ferroelectric RAM (FeRAM). In other embodiments, the external memory 30 may be an embedded memory provided within the SoC 10. The external memory 30 may also be an embedded multimedia card (eMMC) or a universal flash storage (UFS). The elements 100, 110, 120, 130, 140, 150, 160, and 170 may communicate with one another through the bus 180.

The display device 20 may display image signals output from the display controller 140. The display device 20 may be implemented, for example, by a liquid crystal display (LCD) device, a light emitting diode (LED) display device, an organic LED (OLED) display device, an active-matrix OLED (AMOLED) display device, or a flexible display device. The display controller 140 controls the operation of the display device 20.

Figure 2:
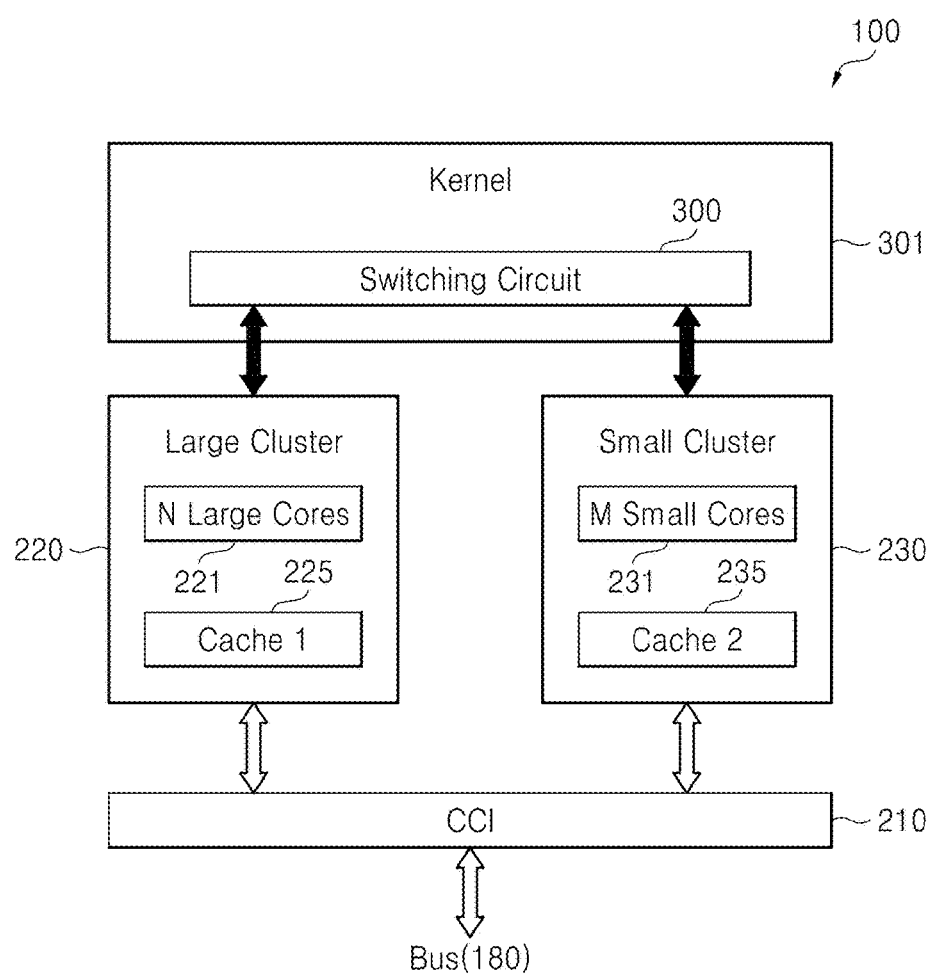
FIG. 2 is a detailed block diagram of an exemplary central processing unit (CPU) such as illustrated in FIG. 1.

FIG. 2 is a detailed block diagram of an exemplary CPU, such as CPU 100 illustrated in FIG. 1. Referring to FIG. 2, the CPU, i.e., processor 100 includes a large cluster 220 for high performance, a small cluster 230 for power efficiency, a kernel 301, and a cache coherent interconnect (CCI) 210.

At least one application (not shown) executed in the CPU 100 enables a core to perform a task. The kernel 301 receives a task from the application and assigns resources to each cluster, and more particularly, to each core.

The large cluster 220 includes a plurality of (e.g., N) first-type cores, such as large cores 221, and a first cache 225. The small cluster 230 includes a plurality of (e.g., M) second-type cores, such as small cores 231, and a second cache 235. The first-type cores could be described as and can exhibit other characteristics as well, such as having a first type of architecture, a first maximum processing speed, etc. The second-type cores could be described as and can exhibit other characteristics as well, such as having a second type of architecture different from the first, a second maximum processing speed different from (e.g., lower than) the first maximum processing speed, etc. In one embodiment, the large cores 221 have high power consumption and operate at a high operating frequency, and the small cores 231 have low power consumption and operate at a low operating frequency. The number of (N) the large cores 221 and the number of (M) of the small cores 231 may be the same as each other (e.g., symmetric) or different from each other (e.g., asymmetric). The large cluster 220, also more generally referred to as a first-type cluster, and the small cluster 230, also generally referred to as a second-type cluster, may be heterogeneous clusters.

The processor 100 includes the large cores 221 and the small cores 231 and drives an appropriate one of the cores 221 and 231 according to a CPU load provided by an application. In certain embodiments, the processor 100 drives the small cores 231 when the CPU load is small and drives the large cores 221 when the CPU load is large.

The processor 100 also controls the operations of the cores 221 and 231 according to external requests such as forced adjustment of the number of running cores, user configuration, and system configuration, so that the SoC 10 operates reliably.

In certain embodiments, when a CPU load measured in a first-type core, such as small core 231 exceeds a threshold value, the kernel 301 switches a task from the small core 231 to a second-type core, such as large core 221. When a CPU load measured in the large core 221 is less than the threshold value, the kernel 301 switches the task from the large core 221 to the small core 231. For example, a task initially assigned to one core can be switched so that it is assigned to the other core, based on the threshold value. The switching operation of the kernel 301 may be performed even between cores not in a pair relationship. In one embodiment, in order to allow the kernel 301 to perform switching between heterogeneous cores, the first cache 225 and the second cache 235 synchronize data with each other through the CCI 210. When core switching occurs, a switched-on core can immediately perform a given task due to the data synchronization between the caches 225 and 235 through the CCI 210.

In one embodiment, the first cache 225 is a cache memory included in the large cluster 220 and the second cache 235 is a cache memory included in the small cluster 230. The kernel 301 may include a switching circuit 300, which switches between cores. The switching circuit may include hardware, such as registers, logic circuitry, etc., that can perform functions as hardware alone, or that can be programmed with software (e.g., computer program code) to perform the specified functions. The switching circuit may be referred to, for example, as a resource management controller, or simply a controller. As described below, the kernel 301 and/or switching circuit 300 may include determining circuitry (e.g., which may operate using software code) that performs steps of determining resource availability and usage, and may include selecting circuitry for performing steps of selecting cores to assign resources to.

In one embodiment, resources, such as cores or portions of cores, can be assigned in a heterogeneous multi-core processing system that includes a plurality of first-type cores (e.g., having a first size, first maximum processing speed, and/or first architecture) and a plurality of second-type cores (e.g., having a second size, second maximum processing speed, and/or second architecture). When a request to perform a task is received at the CPU, one core from among the first-type cores and second-type cores may be selected to perform the task. This selection may be based, for example, on whether a core has sufficient resources and processing capability to process the task, as well as on a history of usage of the core, as discussed in greater detail below. As an example, if no small core is able to process a task because none of the small cores have sufficient resources available, then a large core can be selected to process the task, and the large core can be selected from a set of available large cores based on certain criteria, such as a history of usage for each large core of the set of available large cores. In an opposite manner, for example, if a group of tasks are performing at a large core, and it is determined that a small core has sufficient processing capability and resources to perform those tasks, those tasks can be moved to a small core. The small core can be selected, for example, based on history of usage information. In addition, to save power, the large core can then be powered down if all of the tasks from the large core have been moved to the small core.

As mentioned above, the kernel 301 and the switching circuit 300 may be implemented using hardware that can perform functions and operations for assigning resources, and may also include a computer program code that can execute particular functions and operations. The kernel 301 and switching circuit 200 may be referred to as an electronic recording medium, e.g., a processor, equipped with the computer program code. As such, the elements 301 and 300, which may operate together as a controller, may be the functional and/or structural combination between hardware and/or software for driving the hardware.

In one embodiment, when a CPU load measured in a small core 231 exceeds the capability of the small core 231, the switching circuit 300 switches one or more tasks corresponding to the CPU load from the small core 231 to a large core 221. When a CPU load measured in the large core 221 is less than the capability of the small core 231, the switching circuit 300 makes a switch from the large core 221 to the small core 231.

Figure 3:
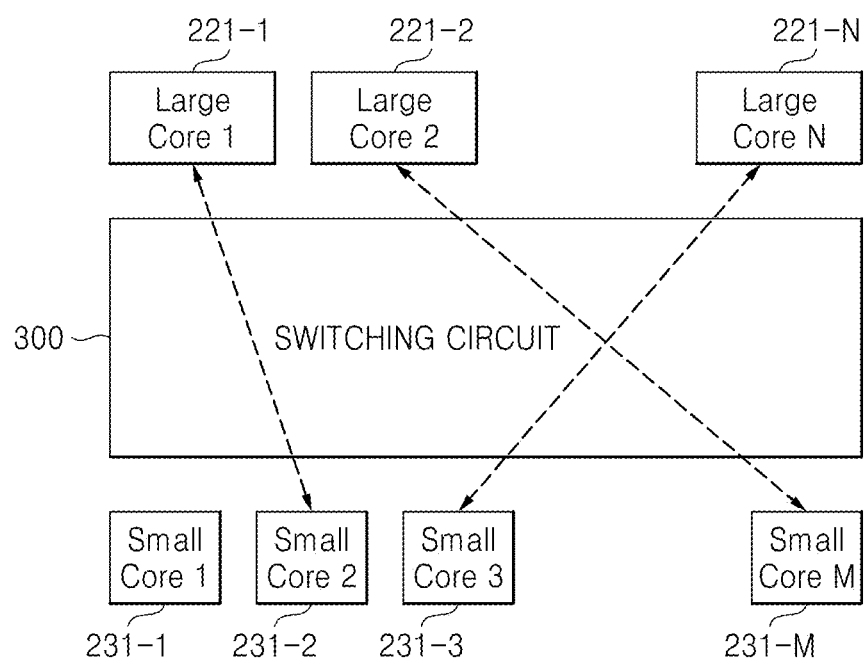
FIG. 3 is a block diagram for explaining an exemplary switching circuit, according to certain embodiments.
Figure 4:
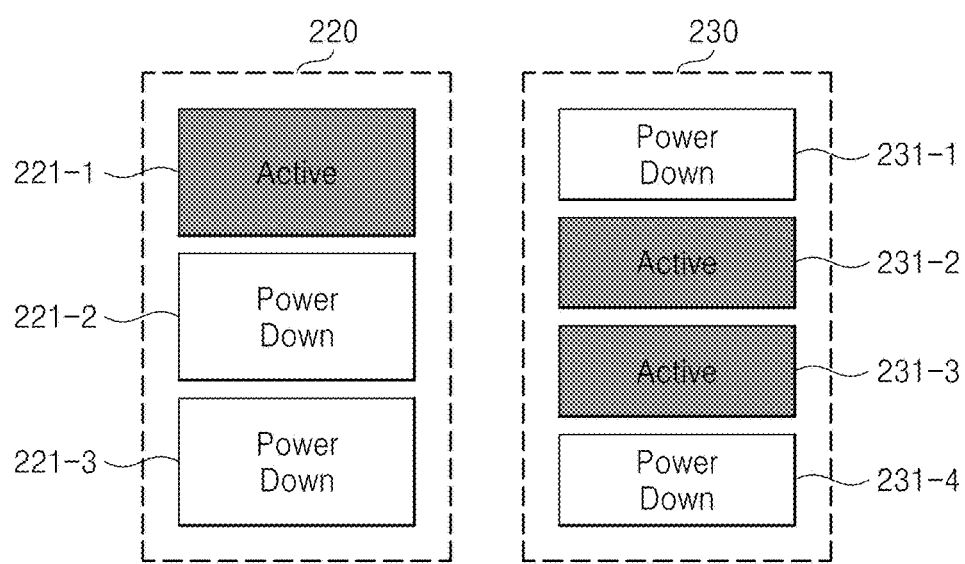
FIG. 4 is a conceptual diagram for explaining exemplary operations of a multi cluster such as illustrated in FIG. 3.
Figure 5:
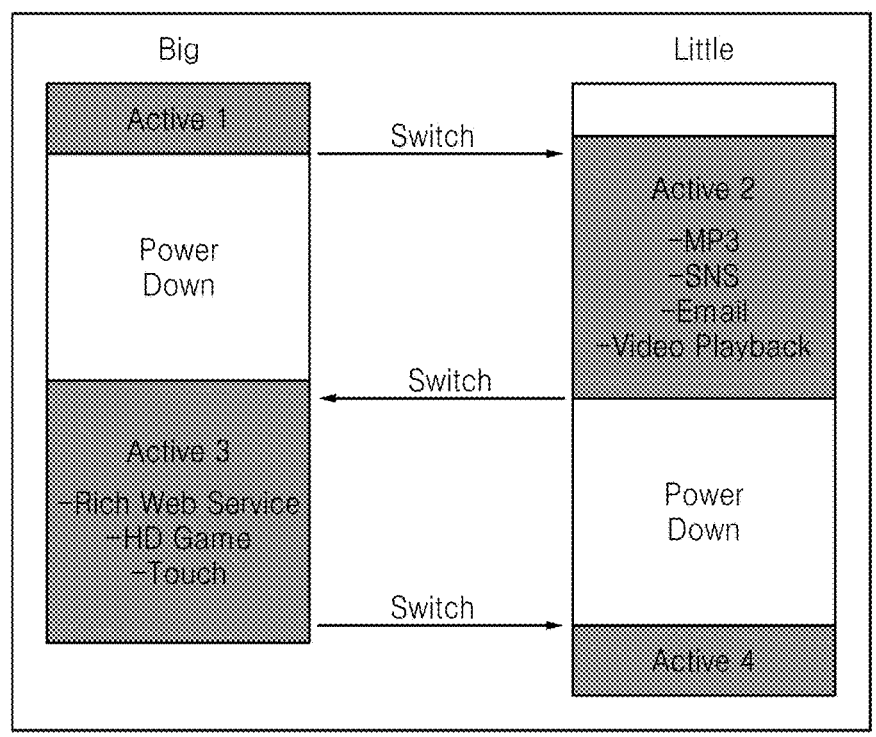
FIG. 5 is a conceptual diagram for explaining exemplary operations of the switching circuit such as illustrated in FIG. 3.

FIG. 3 is a block diagram for explaining an exemplary switching circuit, such as the switching circuit 300 illustrated in FIG. 2. FIG. 4 is a conceptual diagram for explaining the operations of a multi cluster system, such as illustrated in FIG. 3. FIG. 5 is a conceptual diagram for explaining the operations of a switching circuit such as the switching circuit 300 illustrated in FIG. 3.

Referring to FIG. 3, the switcher 300 drives large cores 221-1 through 221-N or small cores 231-1 through 231-M according to a CPU load. For instance, when a CPU load measured in the small core 231-3 exceeds the capability of the small core 231-3, the switching circuit 300 may switch a task from the small core 231-3 to the large core 221-N. Similarly, if a request to allocate resources to a new task is received, and the small core 231-3 does not have sufficient resources available to process the task, the task can be assigned to a different core. If another small core has sufficient resources, the task can be assigned to that core. However, if no other small core has sufficient resources, or if certain small cores are unavailable to process tasks and the available small cores do not have sufficient resources to process the task, then the task may be assigned to a large core. When a CPU load measured in the large core 221-1 is less than the capability of the small cores, the switching circuit 300 may switch a task from the large core 221-1 to one of the small cores (e.g., core 231-2).

Switching between cores may be performed asymmetrically or randomly. For instance, each small core may be switched with a large core that is not in a pair relationship with the small core and each large core may be switched with a small core that is not in a pair relationship with the large core.

Referring to FIG. 4, a case where the number of the large cores 221 is different from the number of the small cores 231 is shown. However, the number of the large cores 221 may be the same as the number of the small cores 231 in other embodiments.

In one embodiment, a controller, such as the switching circuit 300, compares a CPU load corresponding to the request of an application with the capability of a small core and performs task assignment between a large core and the small core based on the comparison. The switching circuit 300 may perform the switching by equalizing the history logs of cores. For example, in certain embodiments, a history log, or a group separate history logs for each core, stores history of usage information for each core. This history of usage information may be accessed when determining which core to assign to a specific task or which core to move a group of tasks to. Details of information that can be included in the history log, as well as how the history log may be populated and stored, are discussed in greater detail below.

As one example, as shown in FIG. 4, according to a CPU load, the first large core 221-1, the second small core 231-2, and the third small core 231-3 are powered on to be active while the remaining cores, i.e., the second and the third large cores 221-2 and 221-3 in the large cluster 220 and the first and fourth small cores 231-1 and 231-4 in the small cluster 230 are powered down.

Referring to FIG. 5, when a CPU load measured by the kernel 301 is within the capability of a small core even while a large core is operating (Active1), the switching circuit 300 may select one of the small cores and perform reverse switching from the large core to the selected small core.

For instance, while tasks, such as playback of an MP3 music file, use of a social network service (SNS), transmission/reception of e-mail, and video playback, are performed in a large core, if the kernel 301 determines that the tasks are within the capability of a small core, the switching circuit 300 switches from the large core to the small core so that the tasks are performed in the small core. For example, if the amount of processes and/or amount of hardware needed to operate those tasks is available on a small core, the switching circuit 300 may switch from the large core to the small core. At this time, the switching circuit 300 checks the history log of each of the small cores 231 in the small cluster 230 and powers on one small core 231-k among the small cores 231 in a way of equalizing the history logs, so that the tasks are performed in the small core 231-k (Active2).

While the selected small core 231-k is performing the task, if another task like a rich web service such as a high-definition game or a web-video play requiring high performance is requested by an application and the requested task exceeds the capability of the small core 231-k (e.g., small core 231-k has insufficient hardware and processing resources available to process the requested task), the switching circuit 300 switches from the small core 231-k to the large cluster 220. At this time, the switching circuit 300 checks the history log of each of the large cores 221 in the large cluster 220 and powers on one large core 221-k among the large cores 221 in a way of equalizing the history log, so that the task is performed in the large core 221-k (Active3).

Figure 6:
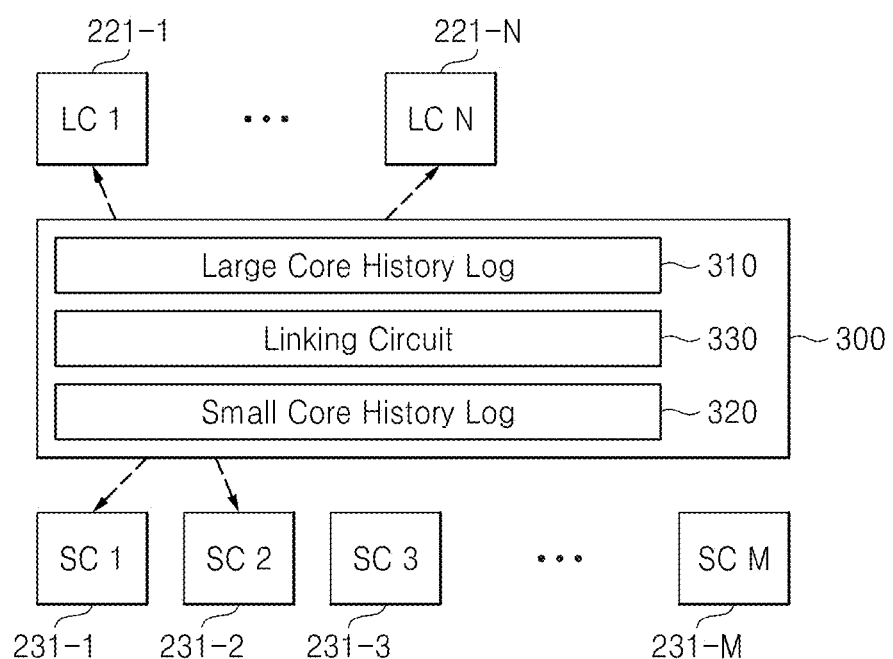
FIG. 6 is a detailed block diagram of an exemplary switching circuit, according to certain embodiments.
Figure 7:
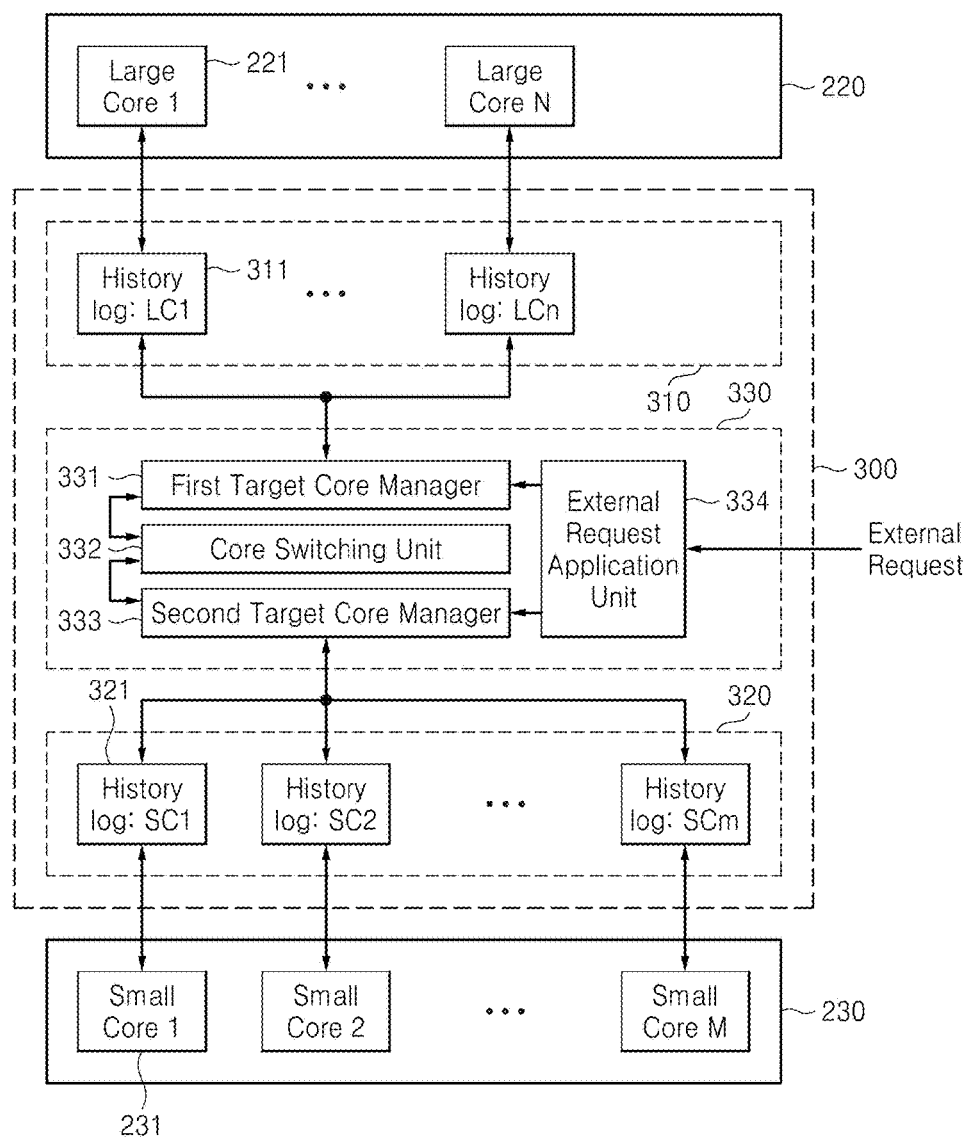
FIG. 7 is a more detailed block diagram of an exemplar switching circuit, according to certain embodiments.

FIG. 6 is a detailed block diagram of an exemplary switching circuit, such as the switching circuit 300 illustrated in FIG. 3. FIG. 7 is a more detailed block diagram of an exemplary switching circuit, such as the switching circuit 300 illustrated in FIG. 3.

Referring to FIGS. 6 and 7, the switching circuit 300 may include a large core history log 310, a small core history log 320, and a linking circuit 330. At least part of the large core history log 310 may serve as a counter to count different categories of history of usage information. Similarly, at least part of the small core history log 320 may also serve as a counter. Certain cores may be in occupied states (e.g., a core may be performing a task in a power-on state), and other cores may be in unoccupied states (e.g., a core may not be performing any tasks and/or may be in a power-off state).

The large core history log 310 keeps track of history of usage information of the large cluster 220. The large core history log 310 may include large core sub-logs 311, i.e., LC1 through LCn, which may respectively correspond to the large cores 221 in the large cluster 220. Each of the large core sub-logs 311 records and stores the history information corresponding to one of the large cores 221.

The small core history log 320 keeps track of history of usage information of the small cluster 230. The small core history log 320 may include small core sub-logs 321, i.e., SC1 through SCn, which may respectively correspond to the small cores 231 in the small cluster 230. Each of the small core sub-logs 321 records and stores the history information corresponding one of the small cores 231. Though the history logs and sub-logs discussed above are described as separate logs, they may be collectively referred to as a single log, and may be structured as one or more logs.

The history log may store specific history of usage information for the different cores. This information may include, for example, a selection count number of a core (e.g., indicating a number of times a core has been selected for processing tasks), a usage time of the core (e.g., indicating an amount of past usage time of the core), an instruction count number (e.g., indicating a number of instructions executed by the core, or a number of tasks executed by the core), or a core load count number (e.g., indicating a historical load amount processed by the core). The history of usage data may be updated each time a core is newly accessed and tasks are processed on the core.

The history of usage data for the different history categories can be maintained in different manners. For example, in one embodiment, the data is maintained for a lifetime of the core. In this situation, the history data may be stored in a nonvolatile memory, or can be stored in a volatile memory and then transferred to a nonvolatile memory before the electronic system is powered off. This history information can be transferred back to a volatile memory at the next power on. In another embodiment, one or more of the data is maintained only for a period during which the electronic system or CPU is powered on. For example, the history information may be stored in a volatile memory, such that the history information is lost when the electronic system is powered off, and counting and logging of history information starts from zero upon subsequent power on. The history logs discussed herein may be stored in one or more buffers, and may thus comprise history buffers.

Other usage information may be stored for the plurality of cores. For example, an occupied/unoccupied status flag may be stored in the log, indicating, for each core, whether the core is occupied or unoccupied. The flag may be, for example, either a 0 or a 1. In addition, a non-selection counter for a cluster may be stored in the log, indicating a number of large cores that are not selected in a large core cluster, or the number of small cores not selected in a small core cluster. These data can be used to determine whether to select a particular cluster or a particular core.

In one embodiment, the switching circuit 300 selects a target core, which will perform a task, based on the history log, e.g., at least one of the selection count number of each core, the usage time of each core, the instruction count number for each core, the CPU load count number, or the other information stored in the history logs 310 and 320. Accordingly, the switching circuit 300 considers at least one of the factors affecting the life span of each core and selects the target core in a way of equalizing the frequency and the amount of use of each core.

The switching circuit 300 is designed to avoid an access concentrated on a particular core, thereby preventing the decrease of the overall life span of multiple cores. Accordingly, the switching circuit 300 uniformly spreads the usage over the multiple cores. For instance, the switching circuit 300 may compare the selection count numbers of respective unoccupied cores in each cluster and may select a core that has the least selection count number as a target core.

As an example, the switching circuit 300 may compare the usage time among the unoccupied cores in each cluster and select a core having the least usage time as the target core. Alternatively, the switching circuit 300 may compare the instruction count number among the unoccupied cores in each cluster and select a core having the least instruction count number as the target core. As another alternative, the switching circuit 300 may compare the load count number among the unoccupied cores in each cluster and select a core having the least load count number as the target core. As yet another alternative, the switching circuit may select the target core according to importance corresponding to the weighted average of at least two of the selection count number of each core, the usage time of each core, the instruction count number of a task performed by each core, and the CPU load count number, which are stored in the history logs 310 and 320.

The linking circuit 330 performs a switch between a large core and a small core in response to a switching request, and/or selects cores for which to allocate newly requested tasks. In one embodiment, as shown in FIG. 7, the linking circuit 330 includes a first target core manager 331, a core switching unit 332, a second target core manager 333, and an external request application unit 334. Each of first target core manager 331, core switching unit 332, second target core manager 333, and external request application unit 334 may include one or more circuits including registers, logic gates, and other circuit elements for implementing the determining, selecting, and other processes described herein. In addition, these elements may include software or firmware that, combined with hardware, implement the processes described herein.

In one embodiment, the first target core manager 331 monitors the power-on/off of each large core 221 and a current CPU load of each occupied large core. Then, if a request to allocate resources to a new task is received, or if it is determined that a current load on a small core is too large for the small core to handle, the first target core manager 331 selects a large target core from large cores currently having no workload in the large cluster 220 based on the history log of each of the large cores 221. The requested task may then be assigned to the selected large core, or a set of tasks currently executing on the small core may be moved to the selected large core.

The second target core manager 333 monitors the power-on/off of each small core 231 and a current CPU load of each occupied small core. In one embodiment, the second target core manager 333 selects a small target core from small cores currently having no workload in the small cluster 230 based on the history log of each of the small cores 231.

When receiving a switching request from the first target core manager 331 or the second target core manager 333, the core switching unit 332 compares the monitored CPU load with the capability of a small core and makes a switch between a large core and the small core. For instance, the core switching unit 332 may switch from a small core to a large target core when the CPU load exceeds the capability of the small core. When the CPU load is within the capability of a small core, the core switching unit 332 may make a reverse switch from a large core to a small target core. The target core managers therefore comprise a detection circuit that detects the various loads and availabilities of the different cores in the multi-core system.

The linking circuit 330 may also include the external request application unit 334. The external request application unit 334 receives an external request and excludes from target core candidates a core that is forcefully adjusted at the external request among unoccupied cores selected by the second target core manager 333. The external request may include user configuration, system configuration, fault condition, and power status of a SoC. For instance, the external request application unit 334 may restrict the number of occupied cores, which operate at a time, in the SoC 10 according to the system configuration or the power status of the SoC 10. The external request application unit 334 may restrict the use of a particular core according to the user configuration. The external request application unit 334 may also restrict a core in fault or error not to be a target core.

Figure 8:
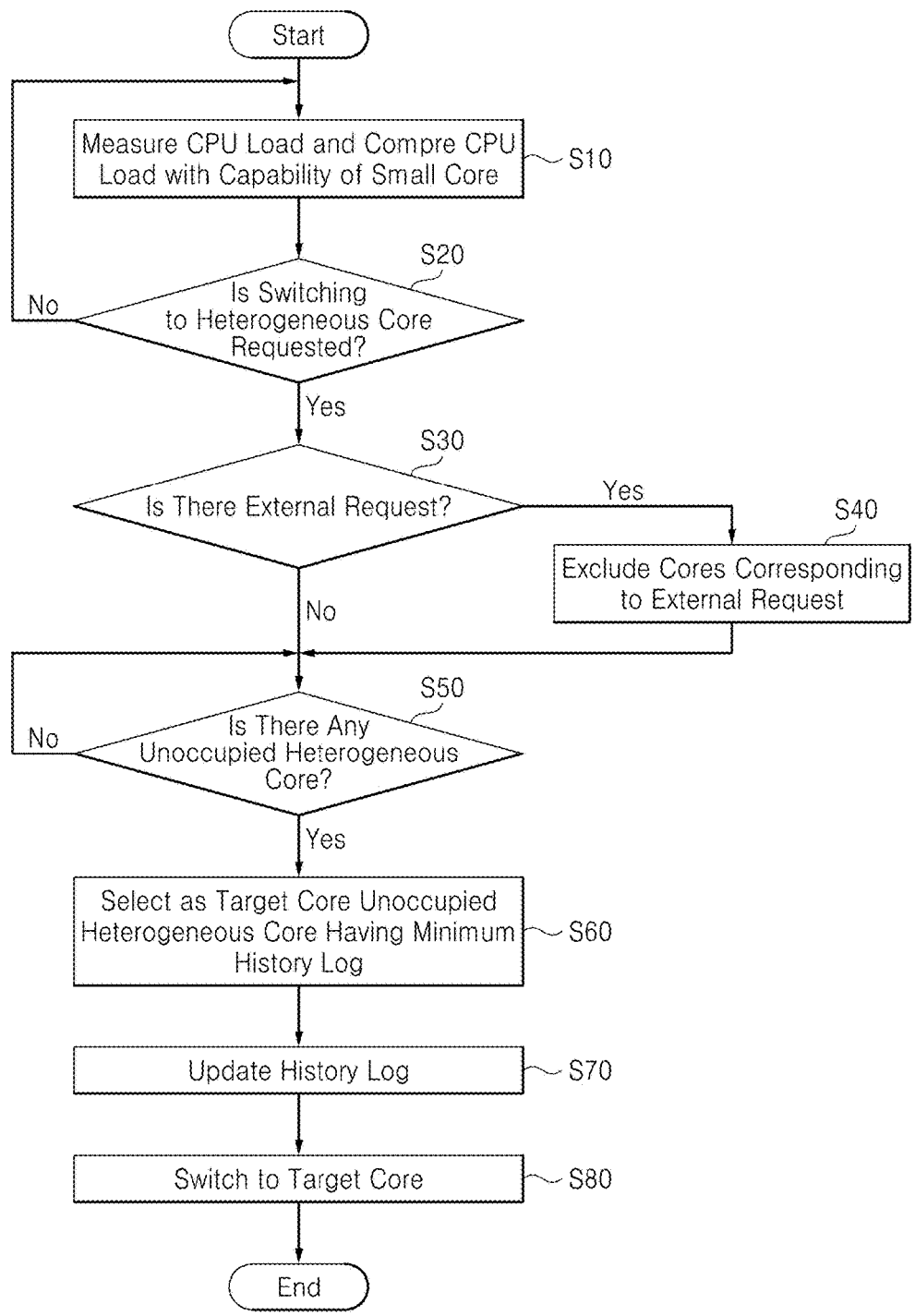
FIG. 8 is a flowchart of an exemplary method of operating a system on chip (SoC) according to some embodiments.

FIG. 8 is a flowchart of a method of operating the SoC 10 according to some exemplary embodiments. Referring to FIG. 8, the SoC 10 measures a CPU load of an occupied core. The SoC 10 may request switching to a heterogeneous core in operation S20 based on whether the CPU load exceeds the capability of a small core in operation S10.

The SoC 10 excludes cores restricted by an external request in operation S40 when there is the external request in operation S30. The SoC 10 identifies occupied heterogeneous cores and unoccupied heterogeneous cores among the remaining cores after the exclusion in a heterogeneous cluster in operation S50. The SoC 10 checks the history log of each of the unoccupied heterogeneous cores, which are powered off with no CPU load, and selects as a target core an unoccupied heterogeneous core having the particular usage according to its history log in operation S60. Alternatively, or additionally, the SoC 10 may check which cores have sufficient resources to process the task, and may then select as a target core from among those cores having sufficient resources, based on the particular usage. This check for sufficient resources may be among occupied cores, unoccupied cores, or both. The particular usage may be, for example, a minimum value among one or more of the selection count number, the usage time, the instruction count number, and the load count number. The minimum value may be of a single criteria, or may be a minimum weighted-average of at least two of the factors. The weighted average may be set according to user or system configuration.

The SoC 10 updates the history log of the core from which switching occurs (e.g., the core before switching) in operation S70. For instance, the SoC 10 may update the selection count number, the usage time, the instruction count number or the load count number of the core from which switching occurs. Furthermore, the SoC 10 updates the history log of the target core in operation S70. For instance, the SoC 10 may update the selection count number of the target core.

For instance, in one example, we may assume that switching is made from a small core to a large core. When a first CPU load measured in an occupied small core exceeds the capability of the small core in operation S10 (for example, a new request is received and the small core has insufficient resources to process the request, such that the load would exceed a threshold amount), switching to a large cluster is requested in operation S20. In this case, the occupied small core is the core requesting switching. The large cluster identifies unoccupied large cores, which are not restricted by the external request in operations S30 and S40, in the large cluster in operation S50. The SoC 10 checks the history log of each of the unoccupied large cores and selects an unoccupied large core having the minimum history log as a large target core in operation S60. The SoC 10 updates the history logs of the occupied small core and the large target core, which are subjected to the switching, in operation S70. The SoC 10 makes a switch to the large target core in operation S80. The large target core is converted from an unoccupied state into an occupied state (e.g., a status flag may be changed) and performs tasks corresponding to the first CPU load. When the first CPU load is completely transferred to the large target core, the SoC 10 converts the small core from the occupied state into the unoccupied state (e.g., power-down).

For another instance, let's assume that that switching is made from a large core to a small core. When a first CPU load measured in an occupied large core is within the capability of an unoccupied small core in operation S10 (e.g., the load is below a particular threshold value able to be processed by the small core), switching to a small cluster is requested in operation S20. The small cluster identifies unoccupied small cores, which are not restricted by the external request in operations S30 and S40, in the small cluster in operation S50. The SoC 10 checks the history log of each of the unoccupied small cores and selects an unoccupied small target core having the minimum history of usage as a small target core in operation S60. The SoC 10 updates the history logs of the occupied large core and the small target core, which are subjected to the switching, in operation S70. The SoC 10 makes a switch to the small target core in operation S80. The small target core is converted from the unoccupied state into the occupied state and performs tasks corresponding to the second CPU load. When the second CPU load is completely transferred to the small target core, the SoC 10 converts the large core from the occupied state into the unoccupied state (e.g., power-down).

Although certain methods of operation are described above, the resource allocation and task moving operations performed by the SoC 10 described herein can be performed in different manners. For example, in certain embodiments, when a target core is selected, rather than only selecting from among unoccupied cores, occupied cores can be potential target cores as well, wherein an availability of resources in the occupied cores are taken into account, along with the history of usage data, user-selected criteria, and other possible factors. Also, in one embodiment, prior to any large core being selected as a target core, the system allocates new tasks to any small core that can handle the task. Then, when no small cores are able to handle a new task, or when the load for all small cores increases above a threshold value, all of the tasks being performed on the small cores may be moved to one large core. As such, all small cores can then be powered off.

In addition, although various examples are given relating to switching between large core and small cores (more generally referred to as first-type cores and second-type cores), certain switching and resource allocation processes described herein may be applied between cores having a same type. For example if a new task is unable to be processed by a currently occupied small core, it can be allocated to another small core capable of processing it prior to being allocated to a large core.

Figure 9:
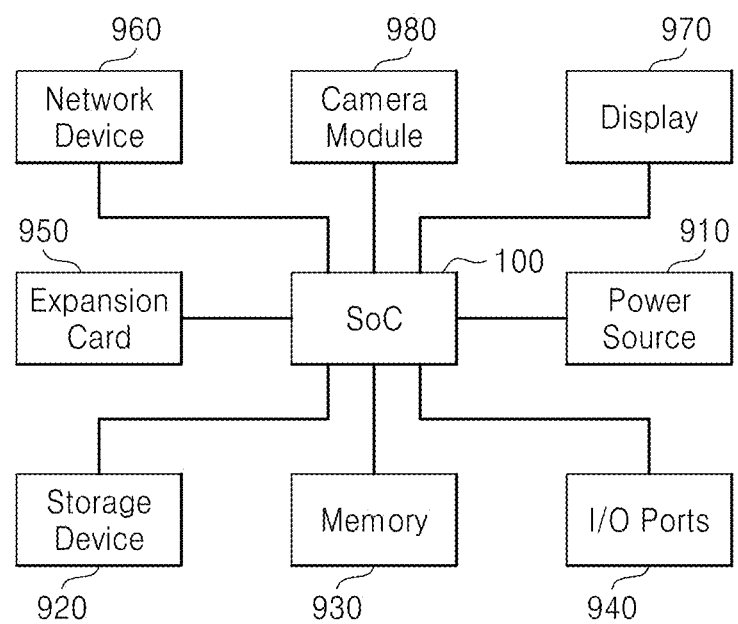
FIG. 9 is a block diagram of an exemplary electronic system including the SoC according to some embodiments.

FIG. 9 is a block diagram of an electronic system including an exemplary SoC according to some embodiments. Referring to FIG. 9, the electronic system may be implemented, for example, as a personal computer (PC), a data server or a portable electronic device.

The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

The electronic system includes the SoC 10, a power source 910, a storage device 920, a memory 930, I/O ports 940, an expansion card 950, a network device 960, and a display 970. The electronic system may further include a camera module 980.

The SoC 10 may include the CPU 100 illustrated in FIG. 1. The CPU 100 may be a multi-core processor.

The SoC 10 may control the operation of at least one of the elements 910 through 980. The power source 910 may supply an operating voltage to at least one of the elements 100, and 920 through 980. The storage device 920 may be implemented, for example, by a hard disk drive (HDD) or a solid state drive (SSD).

The memory 930 may be implemented by a volatile or non-volatile memory. The memory 930 may correspond to the external memory 30 illustrated in FIG. 1. A memory controller (not shown) that controls a data access operation, e.g., a read operation, a write operation (or a program operation), or an erase operation, on the memory 930 may be integrated into or embedded in the SoC 10. Alternatively, the memory controller may be provided between the SoC 10 and the memory 930.

The I/O ports 940 are ports that receive data transmitted to the electronic system or transmit data from the electronic system to an external device. For instance, the I/O ports 940 may include a port connecting with a pointing device such as a computer mouse, a port connecting with a printer, and a port connecting with a USB drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system to be connected with a wired or wireless network. The display 970 displays data output from the storage device 920, the memory 930, the I/O ports 940, the expansion card 950, or the network device 960.

The camera module 980 converts optical images into electrical images. Accordingly, the electrical images output from the camera module 980 may be stored in the storage module 320, the memory 930, or the expansion card 950. Also, the electrical images output from the camera module 980 may be displayed through a display 320.

As described above, according to some embodiments, a history log is considered when a assigning tasks among cores in processor including multiple cores, so that the cores are evenly used. The cores may include different types of cores (e.g., having different architectures, sizes, and/or processing speeds) that form a heterogeneous multi-core processor. In addition, the cores may be used so as to equalize the life span among the cores, so that the overall life span of heterogeneous cores is increased and furthermore the overall life span of a SoC is increased. Moreover, first-type cores and second-type cores may be asymmetrically switched with each other, so that the number of first-type cores and the number of second-type cores being used are flexibly adjusted, which is advantageous in designing multi-core processors.

What is claimed is:

1. A method of in a heterogeneous multi-core processing system having a plurality of first-type cores and a plurality of second-type cores, wherein the first-type cores have a first maximum speed or a first size and the second-type cores have a second maximum speed faster than the first maximum speed or a second size greater than the first size, the method comprising:
    maintaining history of usage information in a first history log for each core of the plurality of first-type cores and in a second history log for each core of the plurality of second-type cores,
    wherein the history of usage information for each core includes one or more of:
        a selection count number indicating a number of times the core has been selected;
        a usage time indicating an amount of past usage time of the core;
        an instruction count number indicating a number of instructions executed by the core; and
        a core load count number indicating a historical load amount processed by the core, and
    wherein the first history logs and second history logs are part of a controller;
    receiving by the controller an external request, wherein the external request is to exclude from target candidate cores at least one core from among unoccupied cores;
    receiving a request to perform a task;
    excluding as a target candidate core the at least one core based on the external request, the at least one core being an unoccupied core from among the plurality of first-type cores and the plurality of second-type cores;
    selecting a first core from among the plurality of second-type cores to perform the task, wherein the selecting depends at least in part on the history of usage information in the second history log and the selected core not being the at least one core excluded as the target candidate core, and includes determining whether the first core from among the plurality of second-type cores has a small enough load such that it has sufficient resources available to perform the task;
    performing a plurality of tasks on the first core of the plurality of second-type cores; and
    determining that a second core, other than the at least one unoccupied core, of the plurality of first-type cores has a small enough load such that it has sufficient resources to process all of the plurality of tasks being performed on the first core of the plurality of second-type cores; and
    as a result of the determination, moving all of the plurality of tasks being performed on the first core of the plurality of second-type cores to the second core of the plurality of first-type cores, thereby assigning resources of the second core of the plurality of first-type cores to all of the moved tasks;
    updating the history of usage information of the second core in the first history log; and
    performing the plurality of tasks on the second core of the plurality of first-type cores of the heterogeneous multi-core processing system.

2. The method of claim 1, wherein:
    the second core from among the plurality of first-type cores is a core having a first size; and
    the first core of the plurality of second-type cores is a core having a second size larger than the first size.

3. The method of claim 1, wherein:
    the selecting depends at least in part on an occupied or unoccupied state of the plurality of first-type cores and the plurality of second-type cores.

4. The method of claim 1, further comprising: after the moving step, powering down the first core of the plurality of second-type cores.

5. The method of claim 1, wherein:
    the plurality of first-type cores are part of a first cluster of processors; and the plurality of second-type cores are part of a second cluster of processors.

6. The method of claim 1, further comprising:
    storing the history of usage information in a history buffer, wherein the history buffer initially has no history of usage information stored, and for each core of the heterogeneous multi-core processing system, as a result of the core being accessed, a history of usage information indicating a number of times that core has been accessed is updated.

7. A method of assigning resources in a multi-core processing system including a plurality of first-sized cores and a plurality of second-sized cores, the first size being smaller than the second size, the method comprising:

storing history of usage information in a first history log for each core of the plurality of first-sized cores and in a second history log for each core of the plurality of second-sized cores,
wherein the history usage information includes at least one of:
a selection count number indicating a number of times the core has been selected, and
a usage time indicating an amount of past usage time of the core;
determining that a first set of cores of the plurality of first-sized cores each individually have a sufficient amount of resources to process all processes being performed on a core of the plurality of second-sized cores;
selecting at least a first core of the first set of cores based at least in part on the history of usage information,
wherein the first core of the first set of cores is selected from among the first set of cores based at least in part on one or more of the following:
a selection count number indicating a number of times the first core of the first set of cores has been selected;
a usage time indicating an amount of past usage time of the first core of the first set of cores;
an instruction count number indicating a number of instructions executed by the first core of the first set of cores; and
a core load count number indicating a historical load amount processed by the first core of the first set of cores;
performing a plurality of processes on a second core of the plurality of second-sized cores;
as a result of the selecting, moving all of the plurality of processes being performed on the second core of the plurality of second-sized cores to the selected first core of the first set of cores, thereby assigning resources of the selected first core of the first set of cores to all of the processes;
updating the history of usage information of the first core in the first history log; and
performing the plurality of processes on the first core of the first set of cores of the multi-core processing system.

8. The method of claim 7, wherein the plurality of first-sized cores are cores having a first type of architecture and the plurality of second-sized cores are cores having a second type of architecture different from the first type.

9. A heterogeneous multi-core processing system, comprising:
a plurality of core processors including a plurality of first-speed core processors each having a first maximum speed and a first amount of resources, and a plurality of second-speed core processors each having a second maximum speed faster than the first speed and a second amount of resources;
a controller coupled to the plurality of core processors;
a first history log that stores a first history of usage information for each core of the plurality of first-speed core processors;
a second history log that stores a second history of usage information for each core of the plurality of second-speed core processors, wherein the first and the second history usage information includes at least one of:
a selection count number indicating a number of times the core processor has been selected, and
a usage time indicating an amount of past usage time of the core processor;
an instruction count number indicating a number of instructions executed by the core processor; and
a core load count number indicating a historical load amount processed by the core processor;
wherein the controller is configured to:
(1) in response to a determination that a load on a first first-speed core processor of the plurality of first-speed core processors is above a first threshold load amount:
select a first second-speed core processor of the plurality of second-speed core processors based on a history of usage of the plurality of second-speed core processors, and
assign one or more tasks to the first second-speed core processor of the plurality of second-speed core processors;
(2) when a second second-speed core processor of the plurality of second-speed core processors is performing a plurality of tasks, and a determination is made that all of the plurality of tasks being performed by the second second-speed core processor of the plurality of second-speed core processors can be processed using the first amount of resources or less:
select a second first-speed core processor of the plurality of first-speed core processors, which is not the at least one excluded first-speed core processor of the plurality of first-speed core processors, based on a history of usage of the plurality of first-speed core processors;
move all of the plurality of tasks from the second second-speed core processor of the plurality of second-speed core processors to the second first-speed core processor of the plurality of first-speed core processors;
update the first history of usage information of the second first-speed core processor in the first history log; and
perform the plurality of tasks on the second first-speed core processor of the heterogeneous multi-core processing system.

10. The processing system of claim 9, wherein:
each of the plurality of first-speed core processors is powered with a first voltage; and
each of the plurality of second-speed core processors is powered with a second voltage higher than the first voltage.

11. The processing system of claim 9, wherein: the controller comprises hardware and software.

12. The processing system of claim 9, further comprising: a history log storing information reflecting the history of usage of the plurality of the second-speed core processors and the history of usage of the plurality of first-speed core processors.

13. A heterogeneous multi-core processing system comprising:
a plurality of first cores each having a first size;
a plurality of second cores each having a second size larger than the first size, the number of the plurality of first cores being different from the number of the plurality of second cores; and
a controller coupled to the plurality of first cores and the plurality of second cores,
wherein the controller includes:
a first counter configured to count numbers of accesses to the first cores, and a second counter configured to count numbers of accesses to the second cores;
a first history log coupled to the controller and coupled to the plurality of first cores; and
a second history log coupled to the controller and coupled to the plurality of second cores, wherein the first history logs and second history logs store history of usage information for each of the plurality of first cores and the plurality of second cores, and the history of usage information includes one or more of:
a selection count number indicating a number of times the core has been selected;
a usage time indicating an amount of past usage time of the core;
an instruction count number indicating a number of instructions executed by the core; and
a core load count number indicating a historical load amount processed by the core; and
wherein the controller is configured to:
receive an external request, wherein the external request is to exclude from target candidate cores at least one core that is forcefully adjusted at the external request among unoccupied cores,
exclude as a target candidate core the at least one core based on the external request, the at least one core being an unoccupied core from among the plurality of first cores and the plurality of second cores;
receive a request to perform a task;
assign the task to a selected core from among the plurality of first cores and the plurality of second cores, the selected core selected based on at least one of the history of usage information stored in the first history log and the history of usage information stored in the second history log, and the selected core not being the at least one core excluded as the target candidate core;
determine that a set of tasks being performed on a second core of the plurality of second cores can be performed by a first core of the plurality of first cores, based on a determined amount of resources available at the first core;
in response to the determination, move the set of tasks to the first core of the plurality of first cores, so that the set of tasks are performed on the first core of the plurality of first cores of the heterogeneous multi-core processing system; and
update the history of usage information in the first history log or the second history log.

14. The processing system of claim 13, wherein: the controller comprises hardware and software.

15. The processing system of claim 13, wherein the controller is further configured to:
determine that none of the plurality of first cores are able to process the task, and as a result, assign the task to one of the plurality of second cores based on the information stored in the second history log.

16. A system on chip comprising:
a plurality of first cores;
a plurality of second cores different from the plurality of first cores in one or more of transistor size, speed, or architecture; and a controller:
a first history log that stores a first history of usage information for each core of the plurality of first cores; and
a second history log that stores a second history of usage information for each core of the plurality of first cores, wherein the first and the second history of usage information includes at least one of:
a selection count number indicating a number of times the core has been selected,
a usage time indicating an amount of past usage time of the core,
an instruction count number indicating a number of instructions executed by the core, and
a core load count number indicating a historical load amount processed by the core;
wherein the controller is configured to:
exclude as a target candidate core at least one core based on an external request, the at least one core being an unoccupied core from among the plurality of first cores and the plurality of second cores;
determine whether a first core of the plurality of first cores has sufficient resources available to perform a requested task;
when it is determined that the first core does not have sufficient resources to perform the task, select a second core from among the plurality of first cores and the plurality of second cores to perform the task, the selected core not being the at least one core excluded as the target candidate core,
wherein the selecting depends at least in part on history information reflecting a history of usage of the plurality of first cores and the plurality of second cores;
determine whether a first-sized core of the plurality of first cores has sufficient resources to perform all tasks being performed by a second-sized core of the plurality of second cores, the first size being smaller than the second size;
when it is determined that the first-sized core has sufficient resources to perform all of the tasks being performed by the second-sized core, move all of the tasks being performed by the second-sized core to the first-sized core;
update the first history of usage information of the first-sized core in the first history log; and
perform all of the moved tasks on the first-sized core of the system on chip.

17. The system on chip of claim 16, wherein:
the plurality of first cores and the plurality of second cores form a heterogeneous multi-core processing system.

* * * * *

UNITED STATES PATENT AND TRADEMARK OFFICE
CERTIFICATE OF CORRECTION

PATENT NO. : 10,255,118 B2
APPLICATION NO. : 14/061783
DATED : April 9, 2019
INVENTOR(S) : Ki Soo Yu, Kyung Il Sun and Chang Hwan Youn It is certified that error appears in the above-identified patent and that said Letters Patent is hereby corrected as shown below:

In the Claims

On Line 8 of Claim 19, add the word "of" after the word "history".

On Line 12 of Claim 27, add the word "of" after the word "history".

On Line 17 of Claim 32, replace "first history logs" with "first history log" and replace "second history logs" with "second history log".

Signed and Sealed this
Twenty-first Day of May, 2019

Andrei Iancu
*Director of the United States Patent and Trademark Office*